United States Patent [19]

Yoshida

[11] Patent Number: 4,618,523

[45] Date of Patent: Oct. 21, 1986

[54] FORMING A SIMULATED HALFTONE PICTURE

[75] Inventor: Masao Yoshida, Tokyo, Japan

[73] Assignee: Kabushiki Gaisha Waizen, Tokyo, Japan

[21] Appl. No.: 783,432

[22] Filed: Oct. 3, 1985

[30] Foreign Application Priority Data

Oct. 5, 1984 [JP] Japan ............................. 59-209456

[51] Int. Cl.⁴ .............................................. B32B 3/14
[52] U.S. Cl. ..................................... 428/189; 156/63;
156/64; 156/235; 156/240; 156/265; 156/299;
156/353; 428/542.6; 434/97
[58] Field of Search ...................... 40/124.1, 594, 615;
156/58, 63, 64, 235, 240, 265, 299, 353; 428/79,
187, 189, 542.6; 434/96, 97

[56] References Cited

U.S. PATENT DOCUMENTS 1,524,972  2/1925  Hampson et al. ..................... 434/96
3,161,509  12/1964  Howe et al. ...................... 156/58 X
4,208,811  6/1980  Junowicz ............................. 434/96
4,398,890  8/1983  Knowlton ........................... 434/96

*Primary Examiner*—Robert A. Dawson
*Attorney, Agent, or Firm*—Birch, Stewart, Kolasch & Birch

[57] ABSTRACT

Disclosed is a poster including a white base sheet and a plurality of parallel black stripes of various widths that are in conformity with the values in the light or dark tones in an original picture, thereby mixing black and white lines so as to produce a desired halftone picture. The parallel stripes of various widths are formed by a computer-assisted cutter. Its cutting tool is moved in an adhesive black film in response to an electrical signal representing the values in the light and dark tones in the stripe pattern of the original picture, thus cutting stripes of various widths in the black film. Then, the black stripes of various widths are applied to the white background, mixing the black stripes and the resultant white stripes, and producing a halftone-like picture.

3 Claims, 12 Drawing Figures

FORMING A SIMULATED HALFTONE PICTURE

BACKGROUND OF THE INVENTION

The present invention relates to a large picture or drawing put up in a public place for advertisement or ornamental purpose, such as a poster showing a landscape, portrait or other continuous-tone picture.

Large pictures or drawings such as those, for instance, which are one meter long and one point five meters broad are generally prepared by painting by hand, or by photographing, developing, enlarging and printing. Both photographing methods and printing methods are advantageous to copying a pattern, compared with painting by hand. Development, enlargement and printing in photography, however, require much labor, and therefore the photography does not fit mass-production of large posters. As for the printing it requires plates, and therefore the unit cost cannot be reduced without printing a large quantity. Still disadvantageously, photographs and printed posters when exposed to the sun, are easy to fade, compared with painted posters.

SUMMARY OF THE INVENTION

One object of the present invention is to provide a large picture or drawing of lasting quality, good resistance to color-fading, and advantageously permitting the faithful reproduction of the same pattern.

Another object of the present invention is to provide a method of producing such a large picture or drawing at an increased efficiency.

To attain these objects a large poster according to the present invention comprises a base member and a plurality of adhesive strips of various sizes, different in color from the base member, arranged parallel to each other and adhered to the base member, all the strips varying in width so as to be in conformity with the values in the light or dark tones in a picture or pattern to be reproduced, thereby mixing different-colored stripes, and causing a halftone-like picture to appear.

A large-sized poster producing method according to the present invention essentially comprises breaking a continuous-tone picture to be reproduced into stripes equally spaced but of various sizes by means of a computer-assisted picture processing system well known per se. Specifically it comprises the steps of: breaking a continuous-tone original up into stripes with an optical sweeping means; producing a digital or analogue electrical signal representing the values in the light or dark tones in the stripe-broken original by means of a picture input/output apparatus connected to said optical sweeping means; cutting stripes of various sizes in an adhesive sheet laid on a base plate by means of a computer-assisted cutter connected to said picture input/output apparatus, thus forming a stripe pattern of which the width of each line varies with said values in the light or dark tones; removing the stripe pattern thus formed from said base plate; and applying the stripe pattern to a desired base member, exposing the background base member in the inter-stripe spaces of the stripe pattern, thereby causing a halftone-like image of the original to appear.

The present invention will be better understood from the following description of preferred embodiments which are shown in the accompanying drawings.

DETAILED DESCRIPTION OF THE PREFERRED EMBODIMENT

Figure 1:
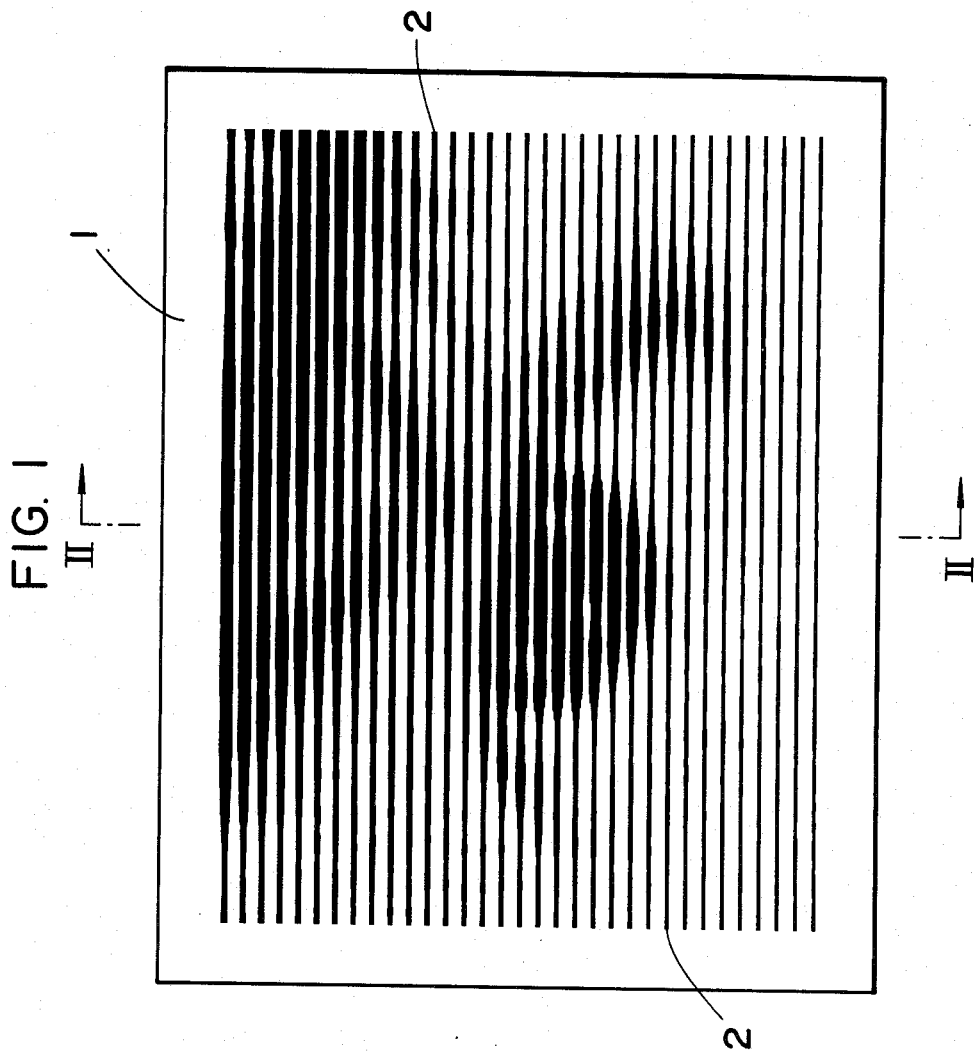
FIG. 1 shows a fraction of a poster example according to the present invention.
Figure 2:
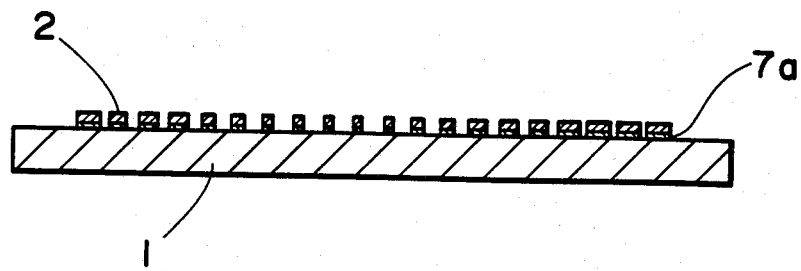
FIG. 2 is a diagrammatical section taken along the line II—II in FIG. 1.

Referring to the drawings, particularly to FIGS. 1 and 2, a poster according to one embodiment of the present invention is shown as comprising a white base plate 1 of expanded styrol and a plurality of adhesive black strips 2 of various sizes. These strips are of plastic film, arranged parallel with each other and applied to one surface of the white expanded styrol sheet. In one example as shown, the expanded sheet 1 is 100 centimeters long and 80 centimeters broad, and 210 parallel strips 2 each 4 millimeters across the broadest width are arranged 0.8 millimeters apart from each other.

These black strips are of so various widths as to be in conformity with the values in the light or dark tones in a picture to be reproduced, thereby mixing black and white stripes when applied to the white base plate, and causing a halftone-like picture to appear. Specifically as shown in FIG. 1, the widths of selected black strips reduce with the increase of lightness in light portions of the picture to be reproduced, accordingly increasing the exposed white area of the underlying base plate. In contrast, the widths of selected strips increase with the increase of darkness in dark portions of the picture, accordingly decreasing the exposed white area of the underlying base plate. Thus, the picture of a human eye is reproduced on the expanded base plate 1. In this example 4 millimeter-wide strips are used, and the width of the strip reduces to 1 millimeter across for the lightest part of the picture, accordingly exposing as wide an inter-stripe part "a" as 3.8 ($=1.5+1.5+0.8$) millimeters. The width of the strip increases to 4 millimeters across for the darkest part of the picture as indicated at "L", accordingly exposing as wide an inter-stripe part "d" as 0.8 millimeters.

Figure 5:
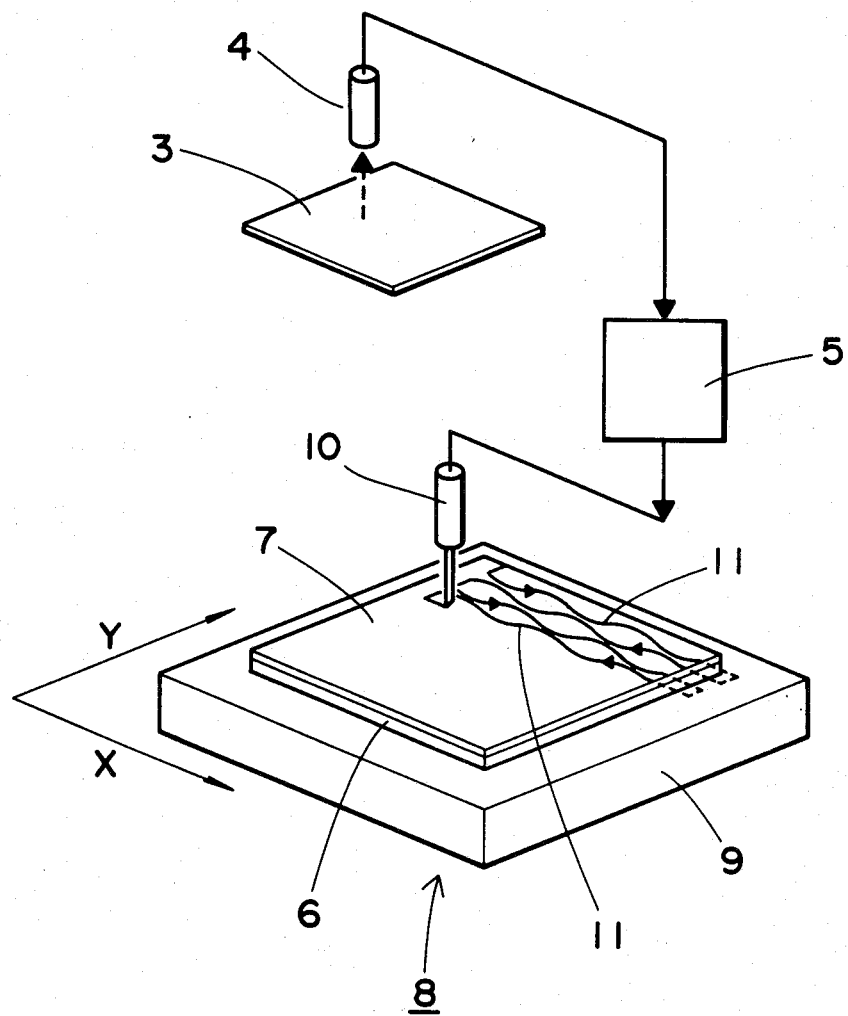
FIG. 5 is a perspective view of a computer-assisted cutter, showing cutting stripes of various sizes in an adhesive overlying sheet.
Figure 6:
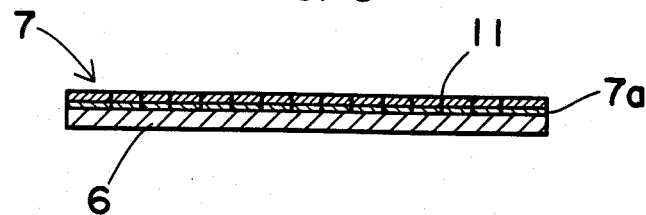
FIG. 6 is a diagrammatical section, showing the striped adhesive film sheet and the underlying base plate.

In producing a poster according to the present invention, a black-and-white photograph 3 is swept by a photoelectric converter means 4 (see FIG. 5), thereby optically breaking the original up into stripes to provide an electric voltage signal representing the varying intensity of light reflected from the striped original while illuminated. A memory associated with a computer 5 stores the picture of the eye in terms of the values in the light and dark tones after the electric signal is appropriately processed by the computer 5.

On the other hand, a release agent 7a is applied to a base plate 6, and then an adhesive sheet of black plastic film 7 is applied to the surface of the base plate. The composite structure is put on a movable stage 9 of an automatic cutter 8 with the black film 7 upside. Then, the movable stage 9 and a cutting tool 10 are moved relative to each other in the X- and Y- directions under the control of the computer 5, thereby causing the cutting tool 10 to cut stripes of various widths in the black film 7 as indicated by lines 11. In this particular embodiment the movable stage 9 is moved only in the Y-direction, whereas the cutting tool 10 is shuttled a given constant distance only in the X-direction.

Figure 3:
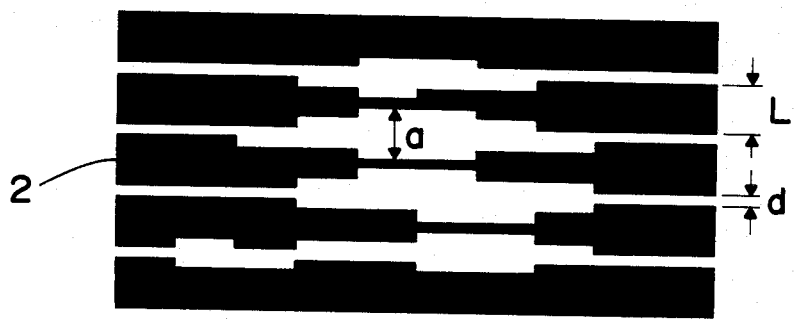
FIGS. 3 and 4 show different stripe modes.
Figure 4:
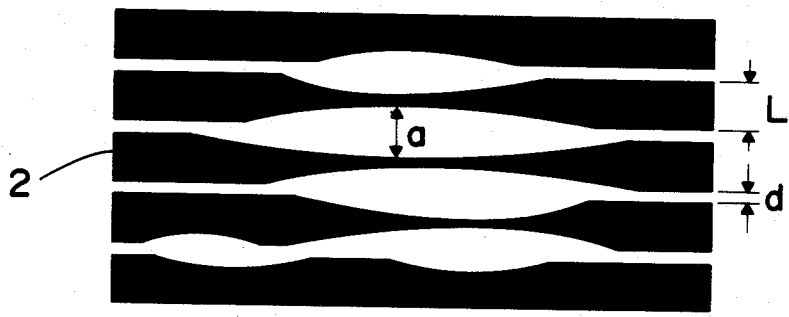

The cut lines may be in the rectangular form as shown in FIG. 3. Otherwise, they may be in the curved form as shown in FIG. 4. In either case every time the cutting tool 10 reaches either turn back point on the X-axis, the movable table 9 is moved a given constant pitch in the Y-direction, thereby feeding the composite sheet structure in the Y-direction.

As seen from FIGS. 3, 4, 5 and 7, adjacent cut lines 11 formed by moving the cutting tool 10 in the right and left directions on the X-axis are almost symmetrical with each other with respect to the longitudinal center line of the inter-stripe space. The movable stage 9 is moved a distance proportional to the value in the light tone in the positive direction on the Y-axis while the cutting tool 10 is crossing a light-toned area in the right direction, and the movable stage 9 is moved a similar distance in the negative direction on the Y-axis while the cutting tool 10 is crossing the light-toned area in the left direction. As a result the adjacent stripes reduce their width toward their longitudinal center lines.

Figure 7:
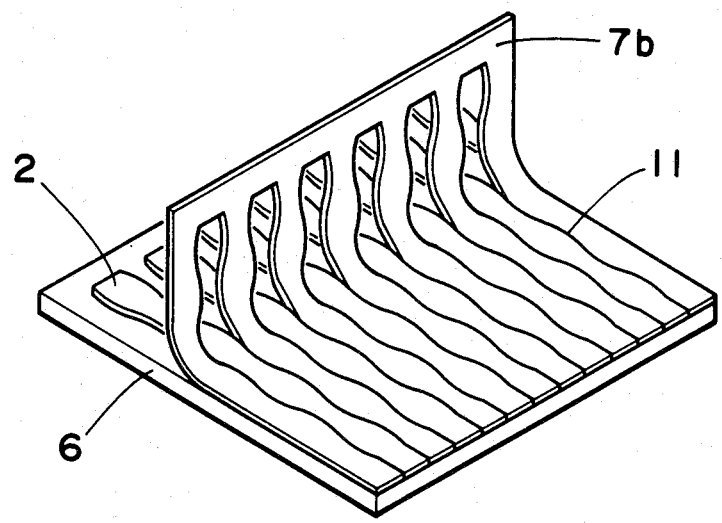
FIG. 7 is a perspective view showing how the undesired portion of the striped film sheet is removed from the underlying base plate.
Figure 8:
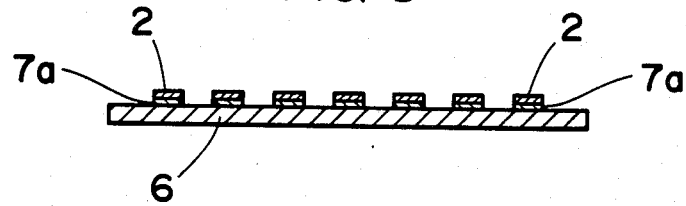
FIG. 8 is a diagrammatical section showing the arrangement of the strips on the base plate after removing the undesired portion of the film sheet.

After the cutting is finished, the margin 7a of the black film 7 at either side thereof is peeled off from the base plate 6 by finger, and then the undesired part 7b of the black film is removed from the base plate 6 by pulling the margin away from the base plate, thereby leaving a desired stripe pattern 2 on the base plate 6 (see FIGS. 7 and 8). As may be perceived from the above, for the sake of convenience in removing an undesired part of the black film from the underlying base plate the cut lines extend short of at least one of the edges of the black film, thus leaving the margin near the edge for permitting the instant removal of the undesired part from the underlying base plate.

Figure 9:
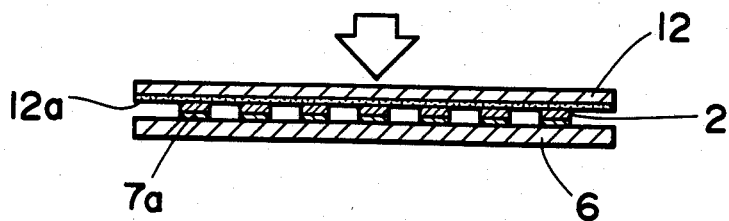
FIG. 9 is a diagrammatical section showing a transfer sheet lying on the stripes and the base plate.
Figure 10:
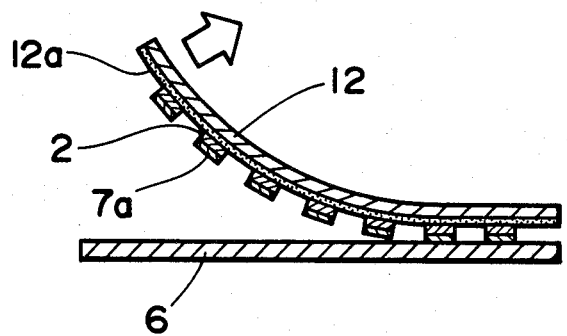
FIG. 10 is a diagrammatical section showing how the stripes are transferred from the underlying base plate to the transfer sheet.
Figure 11:
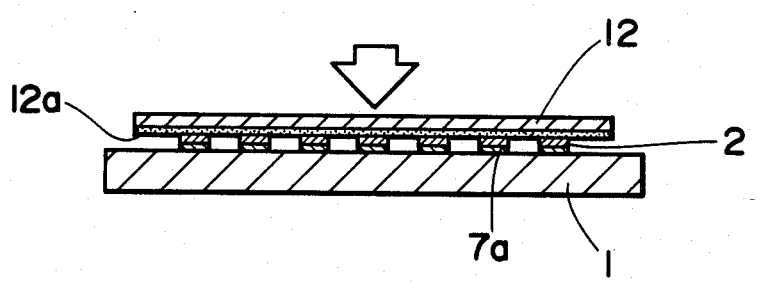
FIG. 11 is a diagrammatical section showing that the transfer sheet and the stripes are applied to a desired base member.
Figure 12:
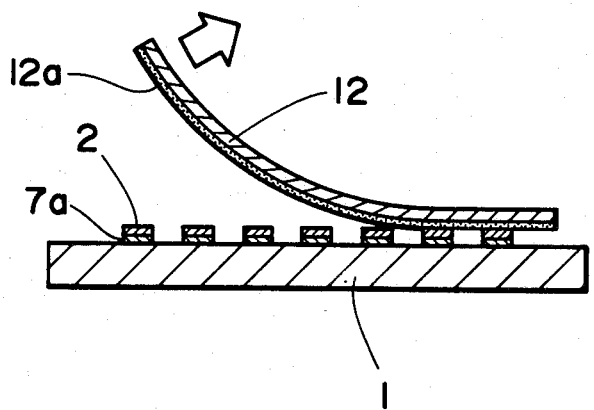
FIG. 12 is a diagrammatical section showing how the transfer sheet is removed, leaving the stripes on the desired base member.

An adhesive transfer sheet 12 is laid on and pushed, as indicated by arrow in FIG. 9, against the black plastic film 2 already cut in the form of stripe pattern. The adhesive agent 12a applied to the transfer sheet 12 has less adhesion than the one 7a applied to the back surface of the black stripe 2. When the transfer sheet 12 is pulled away from the underlying base plate 6, as indicated by arrow in FIG. 10, the black plastic stripe pattern 2 is transferred from the underlying base plate 6 to the transfer sheet 12 thanks to the release agent applied to the adhesive surface of the underlying base plate 6. Then, the transfer sheet 12 is laid on a white expanded styrol sheet 1 with the black plastic stripe pattern 2 sandwiched between the transfer sheet 12 and the white expanded styrol sheet 1. The transfer sheet 12 is pressed against the expanded styrol sheet 1 as indicated by arrow in FIG. 11, and then the transfer sheet 12 is removed, thereby leaving the black plastic stripe pattern 2 on the white base sheet 1 without disturbing the parallel stripe arrangement (see FIG. 12) because the adhesion of the plastic film is stronger than the adhesion of the transfer sheet 12. Thus, a halftone-like image appears.

A black plastic stripe pattern may be applied to any sort of base member other than an expanded styrol sheet. For example, a stripe pattern bearing transfer sheet 12 may be applied to a window pane or a concrete wall, and then the transfer sheet 12 is removed, leaving the black stripe pattern on the window pane on the concrete wall. An adhesive black plastic pattern may be applied to a curved surface such as a telegraph pole.

If a light-reflecting sheet is used as a base sheet 1, the stripe pattern will be clearly visible when exposed to the light from the head lights of a car at night.

Of course, a stripe pattern and a base sheet may be colored as desired, for instance red (stripe) and white (base), white (stripe) and sepia (base) or any other color combination. When a white plastic pattern is applied to a black base sheet, the strip width is wide for light-toned areas of a picture whereas the strip width is narrow for dark-toned areas of the picture, just opposite to the case with the example above described.

As may be understood from the above, a poster according to the present invention has an increased resistance to color fading when exposed to the sun, compared with a conventional poster. This is attributable to the use of strips and background bases of relatively unfading material. Definition can be increased with the increase of the number of stripes per unit length in the crosswise direction, and the stripe density can be easily increased without requiring extra labor and cost. Thus, a continuous-tone picture can be reproduced with an increased fidelity. Advantageously even a small number of posters can be produced at a reduced cost because such a plate as would be required in printing is not required. Still advantageously no matter how large a picture to be reproduced may be, a poster can be easily produced.

What is claimed is:

1. A poster comprising: a base member and a plurality of strips of various widths and of a color different from the color of said base sheet, said strips being arranged parallel to each other at a regular interval distance between the longitudinal center lines of adjacent strips, and being applied to the surface of said base member with an adhesive agent, the widths of said strips varying with the values in the light or dark tones in a picture or pattern to be reproduced, thus showing varying shades by stripes, and producing a desired halftone-like image on the background of said base member.

2. A method of producing posters comprising the steps of:
   breaking an original picture or pattern to be reproduced up into stripes by an optical means;
   providing, by means of a picture inputting-and-outputting apparatus, an electrical signal representing the values in the light and dark tones in said original picture or pattern thus broken up into stripes;
   controlling a computer-assisted automatic cutter on the basis of said electrical signal to cut stripes in an adhesive sheet of colored film, said stripes being of such various widths as are in conformity with the values in the light and dark tones; and arranging said strips parallel with each other at a regular interval distance between the longitudinal center lines of adjacent strips, and applying said strips on a base member.

3. A method of producing posters comprising the steps of:

breaking an original picture or pattern to be reproduced up into stripes by an optical means;

providing, by means of a picture inputting-and-outputting apparatus, an electric signal representing the values in the light and dark tones in said original picture or pattern thus broken up into stripes;

controlling a computer-assisted automatic cutter on the basis of said electric signal to cut stripes in an adhesive film sheet which is applied to a base sheet having a release agent applied thereon, said stripes being of such various widths as they are in conformity with the values in the light and dark tones in said original picture or pattern;

removing the undesired part of said adhesive film sheet from said base sheet, leaving the parallel stripes of various widths on said base sheet;

applying on said base sheet an adhesive transfer sheet having an adhesion less than that in said adhesive film, thus sandwiching said parallel stripes of various widths between said base sheet and said transfer sheet;

pulling said transfer sheet away from said base sheet, leaving said parallel stripes on said transfer sheet;

applying said transfer sheet to a base member, said parallel stripes being sandwiched between said transfer sheet and said base member; and pulling said transfer sheet away from said base member, thereby leaving said parallel stripes on said base member.

* * * * *